United States Patent [19]

Lam

[11] Patent Number: 4,782,905

[45] Date of Patent: Nov. 8, 1988

[54] MINIATURE WEIGHING APPARATUS

[75] Inventor: Albert Lam, Hong Kong, Hong Kong

[73] Assignee: Tron International Corporation, New Rochelle, N.Y.

[21] Appl. No.: 146,836

[22] Filed: Jan. 22, 1988

[51] Int. Cl.⁴ ............................................. G01G 5/04
[52] U.S. Cl. ...................... 177/208; 177/254
[58] Field of Search ................... 177/208, 209, 254

[56] References Cited

U.S. PATENT DOCUMENTS

| | | | |
|---|---|---|---|
| 3,305,036 | 2/1967 | Walters | 177/209 |
| 3,791,375 | 2/1974 | Pfeiffer | 177/209 X |
| 3,974,491 | 8/1976 | Sipe | 177/209 X |
| 3,985,191 | 10/1976 | Wellman | 177/208 |
| 4,002,216 | 1/1977 | Solow | 177/208 |
| 4,085,810 | 4/1978 | Wellman | 177/209 |

Primary Examiner—George H. Miller, Jr.
Attorney, Agent, or Firm—Darby & Darby

[57] ABSTRACT

A weighing apparatus includes a liquid container which is of a variable volume. An transparent press plate is fixed on the upper surface of the liquid container. The top surface of the press plate has weight indexing marks which are indicated in a vortex-like arrangement. The liquid container can be pressed by the press plate to discharge liquid from the liquid container. A transparent, thin hose has an open end communicated with the liquid container, and a closed end positioned just under the indexing marks of the press plate in such a manner that the closed end of the hose is self-wound in a vortex-like arrangement. When the press plate is not pressed, a portion of the hose is gripped by a holding mechanism to prevent the discharged liquid from flowing back into the liquid container. When the press plate is pressed, the hose is released from the holding mechanism thereby permitting the discharged liquid from the liquid container to flow along the hose to a visible position just under one of the indexing marks.

6 Claims, 3 Drawing Sheets

MINIATURE WEIGHING APPARATUS

BACKGROUND OF THE INVENTION

This invention relates to a weighing apparatus, and more particularly to a miniature weighing apparatus.

Heretofore, the standard human weighing apparatus has been cumbersome and inconvenient to transport from one place to another. There lacks an easy to handle apparatus sufficient to measure a person's weight.

SUMMARY OF THE INVENTION

It is therefore the main object of this invention to provide a miniature weighing apparatus which is sufficient to measure a person's weight.

According to this invention, a weighing apparatus includes a liquid container which is of a variable volume. A transparent press plate is fixed on the upper surface of the liquid container for being pressed by an article to be weighed. The top surface of the press plate has weight indexing marks which are indicated in a vortex-like arrangement. The liquid container can be pressed by the press plate to discharge liquid from the liquid container in such a manner that the amount of the discharged liquid is proportional to the weight of the article. A transparent, thin hose has an open end communicated with the liquid container, and a closed end positioned just under the indexing marks of the press plate in such a manner that the closed end of the hose is self-wound in a vortex-like arrangement. When the press plate is not pressed, a portion of the hose is gripped by a holding mechanism to prevent the discharged liquid from flowing back into the liquid container. When the press plate is pressed, the hose is released from the holding mechanism.

Accordingly, when the article is placed on the press plate so that part of the liquid in the liquid container is discharged from the liquid container into the hose, the discharged liquid will flow along the hose to a visible position just under one of the indexing marks.

BRIEF DESCRIPTION OF THE DRAWINGS

Other features and advantages of this invention will become apparent in the following detailed description of a preferred embodiment of this invention with reference to the accompanying drawings in which.

DETAILED DESCRIPTION OF THE PREFERRED EMBODIMENT

Figure 1:
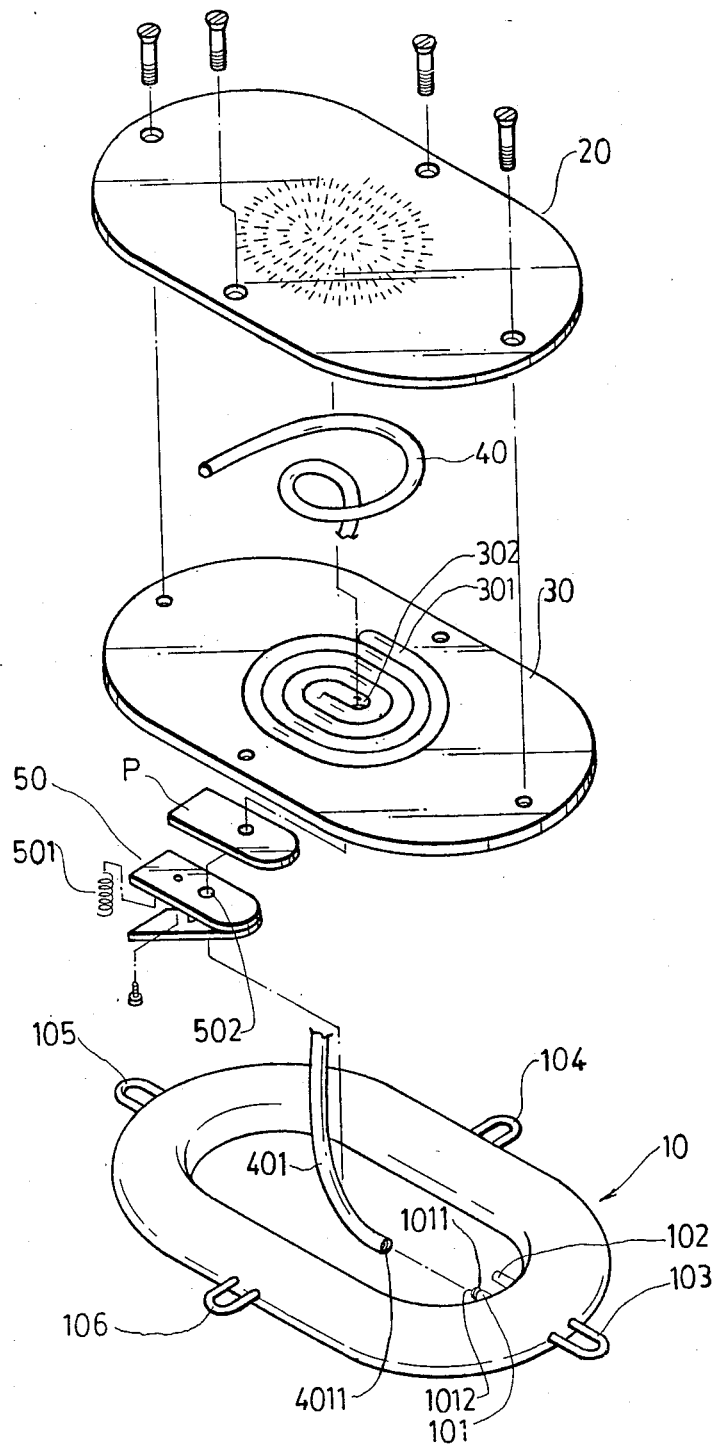
FIG. 1 is an exploded perspective view of a miniature weighing apparatus according to this invention.
Figure 2:
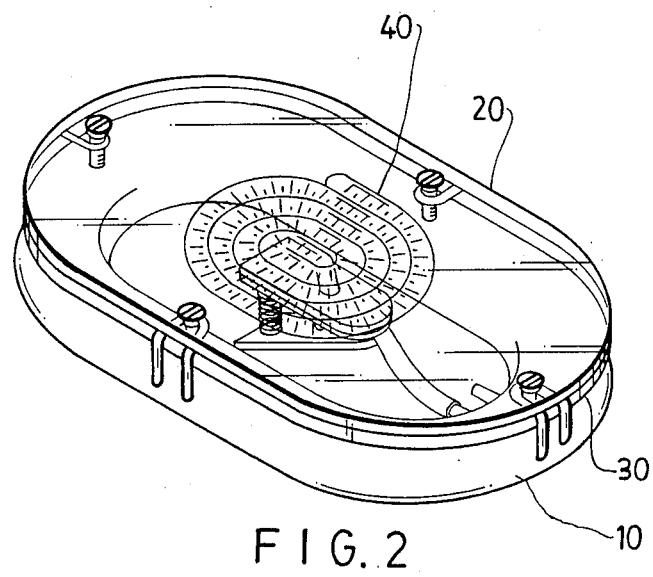
FIG. 2 is an assembled perspective view of the miniature weighing apparatus.

Referring to FIGS. 1 and 2, a miniature weighing apparatus of this invention includes an annular plastic pocket 10 with four equally spaced retaining rings 103–106 attached to the circumference thereof. The pocket 10 is filled with a liquid. The retaining rings 103–106 are made of flexible material so that they can be bent upwardly and subsequently inwardly to extend between a transparent press plate 20 and a positioning plate 30 which are both placed on top of the pocket 10. As illustrated, four bolts are passed through the press plate 20 and the retaining rings 104 to engage threadably with threaded holes in the positioning plate 30. The press plate 20 and the positioning plate 30 are thus fixed on the upper surface of the pocket 10.

Weight indexing marks are indicated on the upper surface of the press plate 20 in a vortex-like arrangement. The positioning plate 30 is oppositely formed in the center portion of its upper surface with a slot 301 in a vortex-like arrangement opposite the indexing marks. At the inner end of the slot 301, a hole 302 is formed through the center of the positioning plate 30.

Mounted on and communicated with the pocket 10 are a discharge tube 101 and a charge tube 102 through which the liquid is charged into the pocket 10. After the pocket 10 has been filled with liquid, the charge tube 102 is sealed. The end of the discharge tube 101 has an externally threaded outer surface 1011 and an internally threaded inner surface 1012. Referring to FIG. 1, a transparent hose 40 has an internally threaded end 4011 engaged threadably with the charge tube 101, and a closed end extending through the center hole 302 in the positioning plate 30 to rest on the positioning plate 30 in the slot 301. The hose 40 has a diameter of 3 mm.

A holding mechanism 50 is screwed to a plate P which is secured to the bottom surface of the positioning plate 30. The holding mechanism includes two rotatably connected jaws between which the hose 40 is clamped. A compression spring 501 interconnects the jaws so as to bias the jaws to tightly clamp the hose 40. A hole 502 is formed through the upper jaw opposite the hole 302 in the positioning plate 30 permitting the hose 40 to pass therethrough. When the press plate 20 is depressed, the spring 501 is pressed to release the hose 40 from the jaws. After the liquid is discharged from the pocket 10 into the hose 40, if the pressure to the press plate 20 is eliminated, the hose 40 will be gripped by the holding mechanism 50 so that the liquid flow in the hose 40 is stopped, thereby permitting the user to read the measured weight valve.

Figure 3:
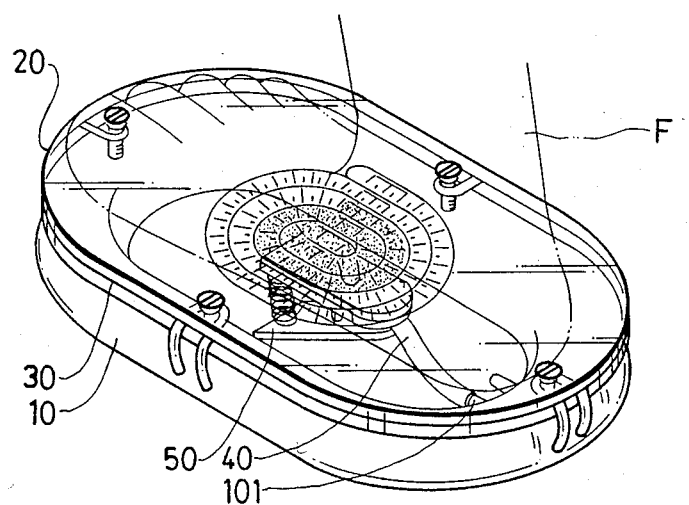
FIG. 3 is a schematic view illustrating the use of the miniature weighing apparatus.
Figure 4:
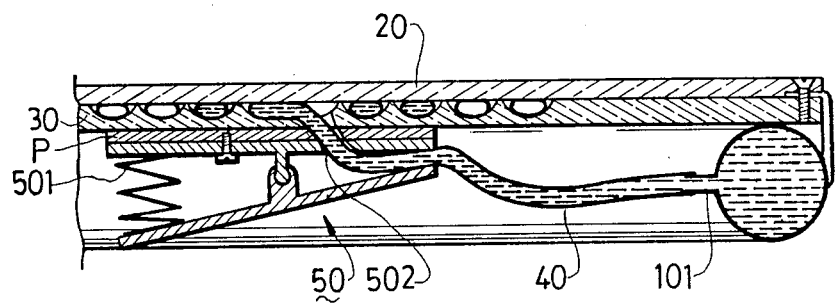
FIG. 4 is a sectional view of the miniature weighing apparatus.

The miniature weighing apparatus of this invention is about the size of a human foot. In use, referring to FIG. 3, when it is desired to measure a person's weight, the perspon can step on the press plate 20 with a foot F while suspending the other foot in the air. The pocket 10 will be pressed to discharge the liquid therefrom. The discharged liquid flows along the hose 40 to a visible position just under one of the indexing marks in accordance with the weight of the person.

Figure 5:
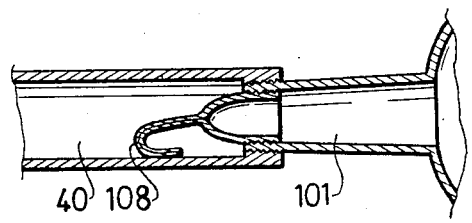
FIG. 5 is a schematic sectional view illustrating how a curved tubular member is disposed at the coupling portion between a hose and a pocket in accordance with this invention.

To obtain high accuracy of the miniature weighing apparatus, referring to FIG. 5, a curved tubular member 108 may be provided at the coupling portion between the hose 40 and the discharge tube 101. The tubular member 108 has a large-diameter end engaged threadably with the discharge tube 101, and a downwardly curved small-diameter end communicated with the hose 40. The small-diameter end is of a diameter greatly smaller than that of the hose 40. With the tubular member 108 intercommunicated with the hose 40 and the discharge tube 101, bubbles in the hose 40 cannot pass into the pocket 10.

With this invention thus explained, it is apparent that numerous modifications and variations can be made without departing from the scope and spirit of this invention. It is therefore intended that this invention be limited only as indicated in the appended claims.

I claim:

1. A weighing apparatus comprising:
   a liquid container;
   a transparent press plate fixed on an upper surface of said liquid container and having a top surface adapted for being pressed by an article to be weighed, said top surface of said press plate having weight indexing marks which are indicated in a vortexlike arrangement, said liquid container being pressable by said press plate to discharge liquid from said liquid container in such a manner that amount of said discharged liquid is proportional to weight of said article;
   a transparent, thin hose having an open end communicated with said liquid container, and a closed end;
   means for positioning said closed end of said hose just under said indexing marks of said press plate in such a manner that said closed end of said hose is self-wound in a vortex-like arrangement; and
   a holding mechanism for gripping a portion of said hose to prevent said discharged liquid from flowing back into said liquid container when said press plate is not pressed, said hose being released from said holding mechanism when said press plate is pressed;
   whereby, when said article is placed on said press plate so that part of said liquid in said liquid container is discharged from said liquid container into said hose, said liquid will flow along said hose to a visible position just under one of said indexing marks.

2. A weighing apparatus as claimed in claim 1, wherein said liquid container is an annular plastic pocket.

3. A weighing apparatus as claimed in claim 1, wherein said hose has a diameter of 3 mm.

4. A weighing apparatus as claimed in claim 1, wherein said means for positioning said closed end of said hose includes a positioning plate connected securely to a bottom surface of said press plate, said positioning plate having an upper surface in which a slot is formed in a vortex-like arrangement opposite said indexing marks for receiving said closed end of said hose therein, and a through hole formed through said positioning plate to communicate with an end of said slot for passage of said hose therethrough.

5. A weighing apparatus as claimed in claim 1, wherein said holding mechanism comprises:
   two jaws rotatably joined together for clamping said portion of said hose therebetween; and
   a spring, interconnecting said jaws for biasing said jaws to clamp said portion of said hose between said jaws, pressable by said press plate to release said portion of said hose from said jaws.

6. A weighing apparatus as claimed in claim 1, wherein said liquid container includes a discharge tube communicated with interior of said liquid container for engaging with said open end of said hose, said discharge tube having at its engaging end a downwardly curved tubular end portion which is of a diameter greatly smaller than that of said open end of said hose, whereby, bubbles in said hose cannot pass into said liquid container.

* * * * *